(12) United States Patent
Rinne et al.

(10) Patent No.: US 6,990,107 B1
(45) Date of Patent: Jan. 24, 2006

(54) METHOD FOR INFORMING LAYERS OF A PROTOCOL STACK ABOUT THE PROTOCOL IN USE

(75) Inventors: Mika Rinne, Espoo (FI); Juha Kalliokulju, Vesilahti (FI)

(73) Assignee: Nokia Mobile Phones, Ltd., (FI)

( * ) Notice: Subject to any disclaimer, the term of this patent is extended or adjusted under 35 U.S.C. 154(b) by 368 days.

(21) Appl. No.: 09/498,891

(22) Filed: Feb. 7, 2000

(30) Foreign Application Priority Data

Feb. 10, 1999  (FI)  ....................... 990264

(51) Int. Cl.
*H04J 3/16* (2006.01)

(52) U.S. Cl. .................. 370/395.6; 370/469

(58) Field of Classification Search .......... 370/252, 370/310, 328, 236, 474, 466, 465, 467, 469, 370/471, 475, 338, 389, 395.1, 395.5, 401, 370/395.6; 455/445, 450, 453; 709/227, 709/228, 229, 230, 236, 237, 238, 246, 249
See application file for complete search history.

(56) References Cited

U.S. PATENT DOCUMENTS

| | | | |
|---|---|---|---|
| 5,446,736 A | 8/1995 | Gleeson et al. | 370/85.13 |
| 5,535,199 A * | 7/1996 | Amri et al. | 370/392 |
| 5,790,553 A | 8/1998 | Deaton, Jr. et al. | 370/466 |

FOREIGN PATENT DOCUMENTS

| | | |
|---|---|---|
| EP | 0701354 A1 | 3/1996 |
| EP | 0798904 A2 | 10/1997 |
| WO | WO 97/08838 | 3/1997 |
| WO | WO 97/41674 | 11/1997 |

OTHER PUBLICATIONS

Stevens, Richard W., "TCP/IP Illustrated, vol. 1", 1994, Addison Wesley, pp. 21-23, 53-59 and 65.*

* cited by examiner

*Primary Examiner*—Alpus H. Hsu
(74) *Attorney, Agent, or Firm*—Perman & Green, LLP

(57) ABSTRACT

A method for transferring information over a data connection in accordance with a protocol stack (206, 210) comprising first and second protocol layers. The method is characterized in that a protocol identifier is created the value of which is determined by means of the first protocol layers of said protocol stack and which is delivered to the second protocol layers of said protocol stack.

1 Claim, 3 Drawing Sheets

METHOD FOR INFORMING LAYERS OF A PROTOCOL STACK ABOUT THE PROTOCOL IN USE

TECHNOLOGICAL FIELD

The invention relates in general to communications protocol stacks. In particular the invention relates to information about the protocols used, which information is communicated between protocol layers.

BACKGROUND OF THE INVENTION

Data communication connections and the protocols used in them are usually depicted using the Open Systems Interconnection (OSI) reference model which comprises seven protocol layers. The idea of having protocol layers is that the functions of the layers and the interfaces between them are specified in detail, and a protocol in use in a given layer of the protocol stack may be changed into another one when desired. To ensure the interchangeability, the protocol layers only operate on the basis of information contained in the fields of their own particular protocol frames.

Future communications networks, especially wireless networks, will employ terminals which will have different characteristics and some of which will be more versatile than current terminals. As there will be terminals of different qualities, the application software must to a certain extent be able to adapt to the characteristics of the terminals. Some applications may only be used on certain terminals and with certain protocols, but some of the programs will know how to adapt to the characteristics of the terminal and the data connection in use. If a terminal supports multiple protocol stacks, the protocols used can be negotiated when establishing the data connection. So, an application program does not necessarily have knowledge of the protocol stack on which it is running.

Resources management for data networks will be more complicated because of a wider selection of terminals, increased number of applications, simultaneous use of different protocol stacks and increased use of the wireless network for packet switched data connections, among other things. Problems will be caused especially by the fact that for a reason or another data networks comprise heterogeneous parts. A packet switched data network, for example, may comprise a fixed and wireless part, or a private subnetwork in addition to the public fixed packet data network. Specifications of connections must be communicated across the interfaces, between the different parts of the network: for instance, if one part has less resources than another, it may be necessary to limit the amount of information transferred between them, or if different parts of the network use different meters for the quality of the connection, these quality parameters will have to be replaced by others. If a connection passes through a different part of the network and returns to a network of the original kind, the connection after that second interface should be as much as possible like the original connection. So, resources management at the interfaces and connection mappings across the interfaces should be coordinated.

FIG. 1 shows a packet switched data connection according to the prior art over a radio link. The protocol stacks used in the equipment are shown at the bottom, and the top of the protocol stack may be dynamically negotiated. The lowest two protocol layers 103 and 104 are always the same both in the transmitter (TX) 101 and in the receiver (RX) 102. These protocol layers are associated with the physical link and its control, in this example with radio wave frequencies, transmission power and possible error correction and retransmission methods. In the transmitter of FIG. 1, the top of the protocol stack may be selected from among three alternatives (105, 106, 107), so the transmitter may connect with receivers that support any of these alternatives. In the receiver of FIG. 1, the top of the protocol stack may be selected from among two alternatives (105, 106). The protocols used are negotiated during the connection setup stage so that both apparatus in FIG. 1 will use the same top of the protocol stack, either 105 or 106.

FIG. 2 shows a prior-art packet switched data connection at the interface between a fixed network and a wireless mobile radio access network. The radio access network comprises base stations and radio network controllers. A wireless terminal 201 is connected via a base station 202 to a radio network controller 203. The radio network controller is connected to a network node 204 at the border of the radio access network and the fixed network. By way of example, a second terminal 205 is shown connected directly to the network node. More likely it will be connected to the network node via routers and other network elements.

FIG. 2 shows, at the bottom, the protocol stacks 206–210 of the apparatus. Each protocol layer's protocol is denoted by the letter L plus the number of the protocol layer. In the lowest two protocol layers, which are different for the fixed network and wireless network, the protocols are marked by symbols in which the letter C refers to a fixed network and the letter R stands for radio access network.

The radio access network employs two different first-layer protocols, which are in FIG. 2 denoted by symbols L1/R1 and L1/R2. Protocol L1/R1 is associated with the radio interface between a wireless terminal and base station, so it is used in the protocol stack 206 of the wireless terminal and in the protocol stack 207 of the base station at the radio interface side. Protocol L1/R2 is associated with radio access network connections over a fixed line, so it is used in the base station protocol stack at the radio network controller side, in the radio network controller's protocol stack, and in the protocol stack 209 of the network node 204 at the radio access network side. All radio access network elements as well as the wireless terminal use the same protocol L2/R in the second protocol layer or, if there are sublayers in the second protocol layer, at least its highest sublayer uses the same protocol. In the radio access network elements, protocol stacks 207 and 208 often cover only the lowest two layers.

At the fixed network side, between apparatus 204 and 205, the packet switched data connection is carried on top of a so-called core network bearer service. The term bearer service refers in this context mainly to the second layer of the protocol stack. The characteristics, say, data transfer capacity or quality, of this core network bearer service are influenced by the physical connections used and the methods associated therewith. The quality of the packet switched data connection proper is usually specified at a higher level, e.g. as quality of service in the IPv6 protocol in the third protocol layer, and the bearer service is chosen such that it can meet the connection quality requirements.

In the network node 203 or alternatively in node 204 the packet switched data connection carried upon a core network bearer service has to be taken on top of a radio access bearer service. In a wireless mobile radio access network there are a certain number of different radio access bearer services, and the qualities that describe them include e.g. the transfer rate, bit error rate (BER) and whether or not the reception of a transferred packet is verified as well as the size of the transfer window used for the verification. The network node must map the core network bearer service to a radio access bearer service that has enough capacity to guarantee a desired connection quality but without wasting radio resources, however. The network node's protocol stack 209 uses in the lowest two layers of the protocol stack fixed network protocols at the fixed network side, and radio access network protocols at the radio access network side.

The third-layer protocol is determined on the basis of the protocol used in the packet switched data network. When a packet switched data connection is established, terminals 201 and 205 may negotiate the protocols used for the end-to-end connection. These protocols usually are protocols on top of the third protocol layer, and they are identical (or at least compatible) in the protocol stack 206 of the wireless terminal and protocol stack 210 of the second terminal. The upper protocol layers do not know that the end-to-end connection between the terminals has crossed a radio interface at some point; as far as they are concerned, the connection could as well be an end-to-end fixed connection.

Prior-art end-to-end connections capable of utilizing dynamically negotiated protocol stacks involve certain problems. For example, in situations where an application knows how to present data as either text, pictures or video, it could exclude the video if it knew that the capacity of the data connection is insufficient to transfer a video image. Moreover, the lower protocol layers do not have knowledge of the capabilities of the upper protocol layers as regards reception of data packets that are in disarray and some of which are missing. If a lower protocol layer does not make sure that the data packets are in order and a higher protocol expects them to be, problems are likely to occur.

A prior-art multimedia application may use either one or more data connections for the transfer of data. For example, data in text format may be transferred via one connection, a video image via a second and sound via a third one, and, in addition, the application may all the time have a connection open through which to transfer commands associated with the synchronization of the objects presented. Another alternative is that these data travel through a single data connection, i.e. the application multiplexes the data streams into a single data stream and an application at the other end of the connection demultiplexes them so that they become separate again. If an application uses multiple separate data connections, problems arise if the lower protocol layers do not understand that these connections belong to one and the same application. In a situation where only part of the data can be delivered because of scarce resources, this may result in that the most important packet switched data connection, in which the control commands are transferred, is slowed down or even disconnected.

For prior-art packet switched data network interfaces it is often necessary to either prioritize the data to be transferred, because of scarcity of data transfer resources, or map the connection quality defined in a certain manner to a connection defined by means of other parameters. In these situations, decision-making in the lower protocol layers would benefit if those layers had knowledge of the information transferred over the connection. For example, knowledge of the typical data transfer rate for the connection would help decide how much resources should be reserved for the connection. In the case of prioritization, more detailed knowledge about the information transferred (whether it is, say, control commands associated with the application software or presentable data) would help in deciding what is the most important information.

SUMMARY OF THE INVENTION

An object of the invention is to provide a method with which it is possible to characterize data for lower protocol layers and the characteristics of the data connection for upper protocol layers. It is advantageous that the method is a hierarchical one, i.e. it is first given a rough description which can then be particularized. It is also advantageous that the description is short.

The objects of the invention are achieved by a method with which it is possible to indicate the protocols or parts of protocols used in given protocol layers to other layers of a protocol stack.

The method according to the invention for transferring information over a data connection in accordance with a protocol stack comprising first and second protocol layers is characterized in that
   a protocol identifier is created,
   a value for said protocol identifier is determined by means of the first protocol layers in said protocol stack, and
   said protocol identifier is delivered to the second protocol layers in said protocol stack.

The upper-layer protocols or their coding methods, for example, characterize the amount of data transferred over a connection as well as burstiness of data, for example. Thus they describe the requirements on the data transfer and, thereby, on the lower protocol layers. The protocols also tell, at least partly, what kind of data flow through the packet switched data connection. A method according to the invention, which identifies the protocols of an upper layer or layers, thus tells the lower protocol layers what kind of data they are transferring. Thus it becomes possible to handle the data packets according to their contents. For example, if the upper-layer protocols are such that they operate better when the data packets are delivered reliably and in the correct order, the lower-layer protocols may make sure that this happens.

Correspondingly, certain lower-layer protocols are associated with data connections that have a limited transfer capacity. Thus, using the method according to the invention the upper-layer protocols may obtain information about the data connection. For example, the transfer rate for a high-speed data connection in a GSM (Global System for Mobile Communications) network is a multiple of 9.6 or 14.4 kbps and normally not more than 28.8 kbps. In a third-generation UMTS (Universal Mobile Telecommunications System) network the maximum data transfer capacity is 2 Mbps. If a terminal that can operate in both UMTS and GSM uses the method according to the invention to indicate to an application at the other end of the connection the protocol used in the link layer, the application may use video to present the data, depending on the data transfer rate.

If the method according to the invention is used to communicate information from the upper protocols to the lower protocol layers, the information about the protocol may be added to the protocol frame. Advantageously a field is reserved in the frame for this purpose. Information in the protocol frame reaches all lower protocol layers in the same terminal, network element, network interface and/or terminal at the other end of the connection. If information is to be sent from the lower protocols to the higher ones, it has to be done indirectly. In a terminal, for example, the information about the lower protocols can be locally signaled to a higher protocol which places that information in its protocol frame or inserts it in the data to be transferred. So the information travels over the connection and reaches the upper protocol layers in the network element, network interface and/or terminal at the other end of the connection.

In the method according to the invention the information about protocols, protocol versions or protocol elements may be transferred in protocol frames of a certain protocol layer, in a field reserved for that purpose. The advantage of using a special field is that the lower protocols need not go through and analyze the whole contents of the packets, but an identifier found at a certain location of a packet identifies the protocols. Another alternative is to communicate this information when setting up the connection. In that case it may be transferred either in a data packet (say, protocol field) associated with the handshake procedure or in a control connection separate from the packet switched data connection used for the data transfer if such a connection is provided.

Since the protocols used in data communications networks are widely known and ratified by standardizing bodies or corresponding organizations, information about them may be communicated using short identifiers. In addition, the identifier according to the invention for communicating protocol information is advantageously a hierarchical data structure, i.e. a protocol or protocols is/are first identified roughly, whereafter a more detailed definition is given. Such a hierarchical data structure is flexible and fast to process as it quickly indicates whether the more detailed part contains relevant information.

Information communicated by the method according to the invention may be utilized locally in the same terminal, in a network element at the network interface or in a terminal at the other end of the connection. The invention takes no position on how to decide in which layers the protocols are the most important as regards data transfer or data presentation formats, for instance, or where and how this information is utilized in the other protocol layers.

BRIEF DESCRIPTION OF DRAWINGS

The invention is below described in greater detail referring to the preferred embodiments of the invention and to the appended drawing, in which.

Figure 1:
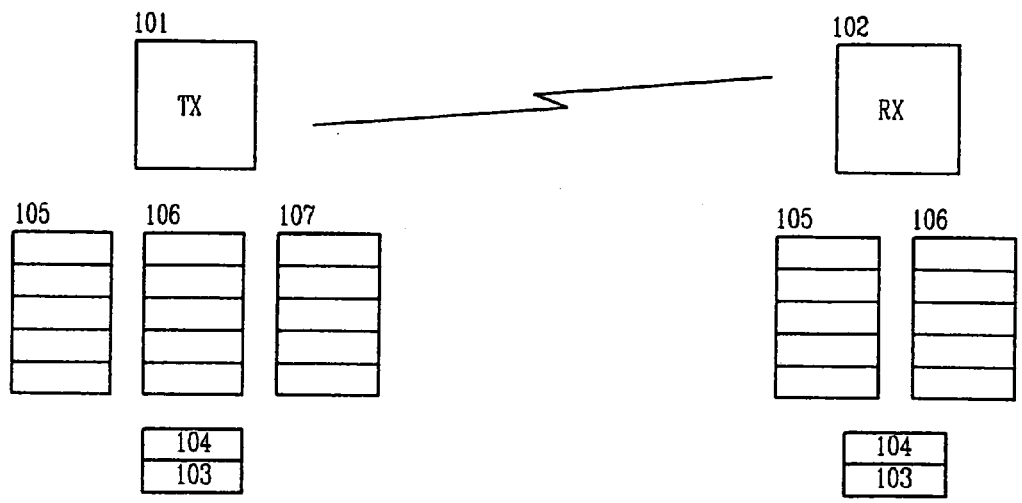
FIG. 1 shows a prior-art packet switched data connection over a radio link with the protocol stacks.
Figure 2:
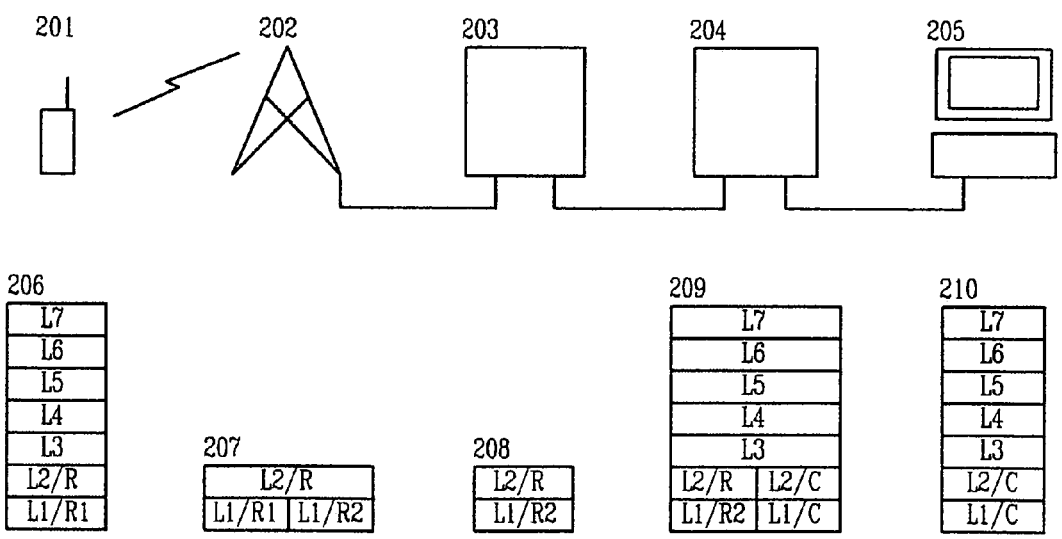
FIG. 2 shows a prior-art packet switched data connection over the air interface of a wireless mobile network with the protocol stacks.

Reference was already made to FIGS. 1 and 2 in the description of the prior art.

DETAILED DESCRIPTION OF THE INVENTION

Figure 3:
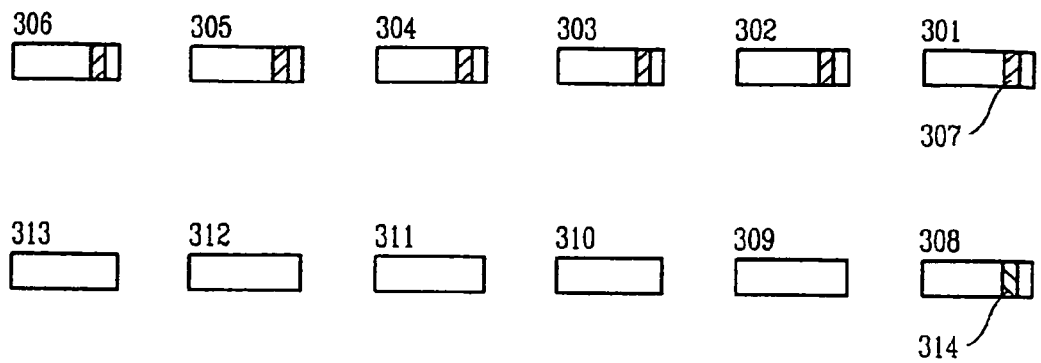
FIG. 3 shows a data communication method according to two preferred embodiments of the invention.

FIG. 3 schematically illustrates two methods according to a preferred embodiment of the invention for communicating information about the protocols in use. The figure shows protocol frames associated with a certain packet switched data connection: the packet at the far right has been sent first.

In each protocol frame, oblique lines indicate that portion of the protocol frame which communicates information about the protocols in use.

The upper part of FIG. 3 shows a method in which the protocol frames 301–306 used for the data transfer proper carry protocol information as well. By way of example, each protocol frame in the figure contains a protocol identifier 307 (say, a protocol field). Depending on the situation, the identifier may be in every protocol frame or only in part of the frames, e.g. in every hundredth frame.

The bottom part of FIG. 3 shows a method in which the information about the protocols used is communicated at the beginning of the connection. The packets 308–313 associated with the data transfer are in chronological order from right to left. In this case the information about the protocols used is in identifier 314 which is in the first protocol frame 308 of the packet switched data connection, but it is more common that the information is transferred in one or more handshaking messages at the beginning of the connection. Another alternative is that the information is communicated via a separate control connection at the beginning of the connection. For example, in mobile networks a terminal usually has a control connection over the air interface and radio access network to a network node on the border of the radio access network, i.e. the control connection exists between the terminal 201 and network element 204 in FIG. 2. This connection may be one of the so-called call control, session management, mobility management or radio resource management (L3) connections and it relates e.g. to the mobility management of the terminal, to the session management and/or to the management of the frequencies and transmission power used in the radio transmission. It may also be established between the terminal and a switch (not shown in FIG. 2) or another apparatus performing control functions. The information about the protocols used in the packet switched data connection may also be transferred via this control connection when opening the packet switched data connection.

Figure 4:
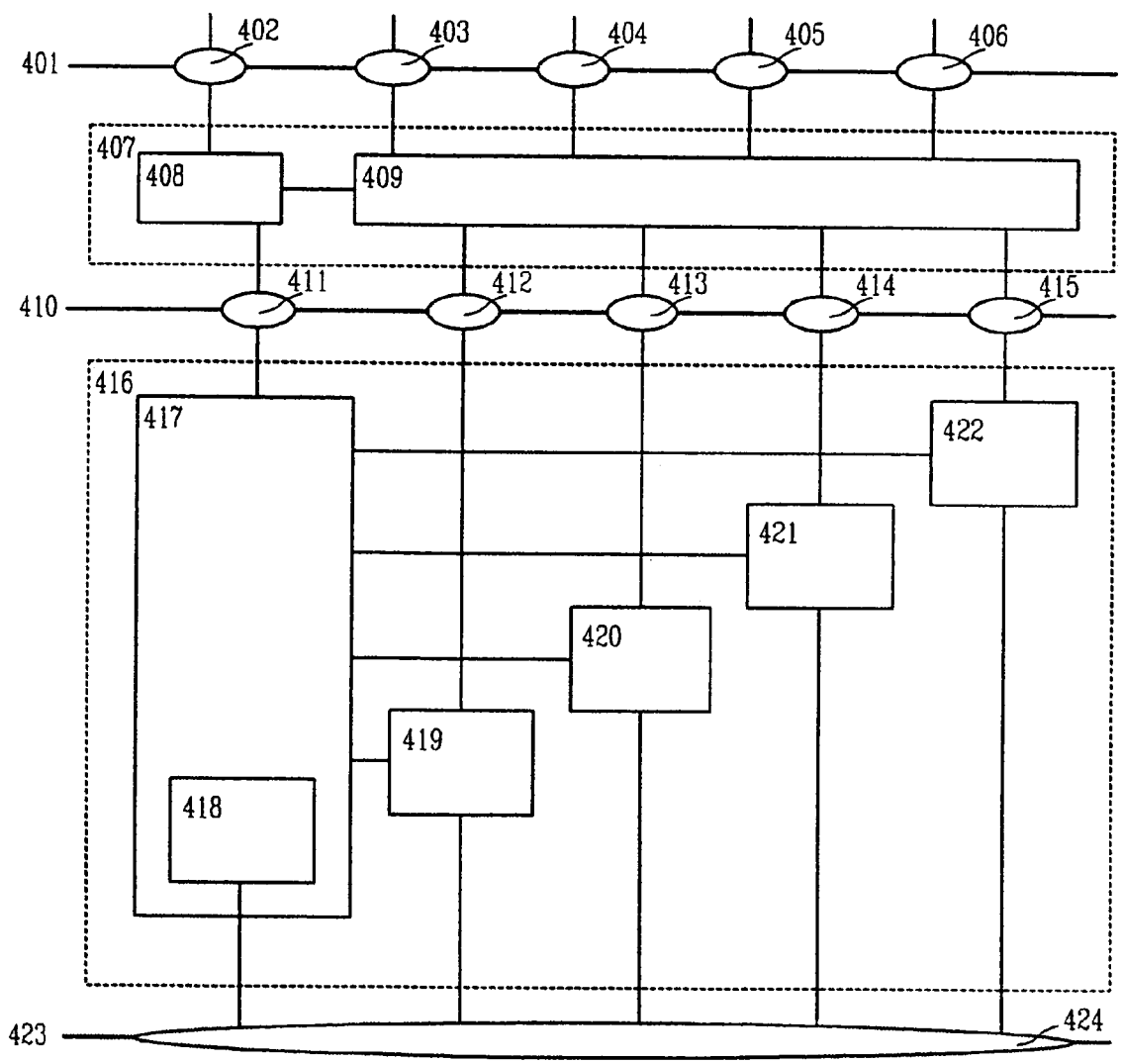
FIG. 4 shows in greater detail a protocol layer associated with a third preferred embodiment of the invention.

FIG. 4 shows a situation which utilizes a preferred embodiment of the invention. FIG. 4 depicts in more detail the structure of the second protocol layer of a radio access network in the packet switched data connection of FIG. 2 in an UMTS network. In an UMTS network, the packet switched data connections associated with a certain terminal or application may be linked together by means of an identifier called a packet switched data protocol context.

At the radio access network side the second protocol layer comprises two sublayers: a link access control (LAC) protocol and media access control (MAC) protocol. FIG. 4 illustrates the operation of the LAC protocol: the third protocol layer is above interface 401 and the MAC layer is below interface 423. The layer 3 compatibility entity (L3CE; essentially equal to PDCP or Packet Data Convergence Protocol) 407 adjacent to the third protocol layer comprises an administrative unit 408 and the compatibility unit 409 proper. The L3CE is responsible for recognizing the data transfer needs of the packet switched data protocol contexts and for presenting said needs to radio bearer services. Network service access points 403–406 are specified for the upper interface of the L3CE such that each access point has a network service access point identifier (NSAPI) of its own. FIG. 4 shows four network service access points by way of example. The L3CE administrative unit 408 has a network service access point 402 of its own.

Each packet switched data protocol context has at its disposal at least one network service access point via which data are transferred to the compatibility unit. At the lower interface 410 of the L3CE there are service access points 412–415 via which data are transferred to radio access bearer services. Each service access point with its characteristics corresponds to a certain type of radio access bearer service and there are as many of them as there are possible different radio access bearer services (FIG. 4 shows four service access points corresponding to four different radio access bearer services). Service access point 411 is associated with data communications between the administrative units of the various layers.

Operation of the compatibility unit 409 is controlled through the administrative unit 408 and it has knowledge of the packet switched data protocol contexts' data transfer quality and quantity requirements agreed during the connection setup stage. However its main function is to flexibly map the network service access points to the service access points according to the data transfer needs of each particular network service access point and to limit the data transfer if an attempt is made to use a transfer rate that exceeds the resources reserved for the packet switched data protocol context in question. It distributes the data packets coming through the network service access points to several service access points if they have different connection quality requirements. It is possible to direct data packets from multiple network service access points to one and the same service access point, i.e. a single radio access bearer service may carry information arriving through several network service access points. The compatibility unit may also perform data or protocol field packing.

Logical link entities 419–422 in the logical link control (LLC) layer 416 control the data transfer over individual radio access bearer services. There is one logical link entity per each service access point. These entities use their own protocol structures into the data fields of which they place the data coming from the compatibility unit 409 via the service access point. A logical link management (LLM) entity 417 which controls the logical link entities is responsible, among other things, for the establishment and termination of the logical link connections, setting of initial parameters of a logical link, handling of certain error conditions and for the communication of logical link control parameters between terminals. It communicates with the LLM entities of other network elements in the radio access network through a logical control link unit 418. From the LLC layer the LLC protocol frames are transferred across the LAC-MAC interface 423 at point 424.

In a preferred embodiment of the invention a network node 204 at the interface of the fixed network and radio access network analyzes what protocols are used in the packet switched data connections. Each logical link entity of this network node adds to its protocol frame (all or just part of them or only during the handshake) a protocol identifier which indicates the higher protocols used. Information about these protocols arrives at the logical link entities via the LLM entity 417. A protocol identifier may be utilized both for selecting a radio access bearer service for a packet switched data connection and for managing radio access bearer services. The protocol identifier may be especially helpful when solving in the MAC layer problems such as repeated retransmissions caused by traffic congestion or transmission deadlocks. For example, selection of retransmission mode, size of possible acknowledge window and adjustment of that size, management of LLC packets, and estimation of the quantity of data transferred are functions where the identification of higher protocols is useful. If, for example, it is known that an application requires real-time data transfer, the radio access bearer service will not carry out retransmissions and tries to send the packets in correct order.

Figure 5:
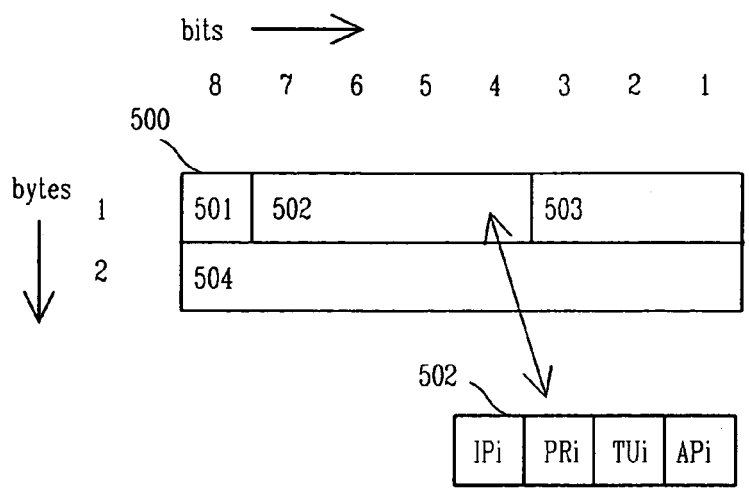
FIG. 5 shows a data structure used for communicating protocol information according to a fourth preferred embodiment of the invention.

FIG. 5 shows a hierarchical data structure 500 according to a preferred embodiment of the invention which identifies protocols in a multiprotocol environment. It is used e.g. in a radio access network to communicate information between the LLC and MAC layers shown in FIG. 4. The protocol identifier may be placed either in a special field in the protocol frame or within the data proper. The protocol identifier shown in FIG. 5 is two bytes long: the bytes are represented as horizontal rows and bits as vertical columns, the least significant bit being farthest to the right.

The most significant bit 501 in the first byte is a so-called poll/final (PF) bit the meaning of which depends on the type of protocol frame in the protocol field of which the protocol identifier is placed. The next four bits 502 are used for rough protocol identification, so the field could be called a protocol content identifier, for example. Each of these four bits is a so-called flag, indicating whether a given protocol is in use. The bottom part of FIG. 5 shows the structure of the protocol content identifier 502 in more detail. The protocols chosen are data communication protocols typically used in packet switched networks. For example, the first IP (Internet Protocol) identifier in the protocol content identifier is associated with the network-layer protocol: 0 indicates that the network protocol used is not IP, and 1 indicates that the protocol is IP. The second PR (Packet Radio) identifier is associated with the wireless packet switched network used: 0 indicates that a GPRS (General Packet Radio Service) network is not used, and 1 indicates that a GPRS network is used. The third TU (Transmission Control Protocol/User Datagram Protocol) identifier distinguishes between the TCP and UDP protocols: 0 corresponds to the use of UDP and 1 corresponds to the use of TCP. The fourth AP (Application Protocol) identifier indicates whether or not the data structure describes the application protocol in more detail (0 means no, 1 means yes).

The last three bits in the first byte of the protocol identifier 500 constitute a protocol field 503 which defines the application protocol in use. The field could be called a protocol content identity group, for example. If the IP identifier is 1 in the protocol content identifier, value 000 in the protocol content identity group corresponds to the IPv4 protocol and value 001 to the IPv6 protocol, for example. If the AP identifier is 1 in the protocol content identifier, value 000 in the protocol content identity group corresponds to Hypertext Transfer Protocol (HTTP), 001 corresponds to the lighter Wireless Application Protocol (WAP) used for wireless connections, 010 corresponds to the MHEG application protocol designed for the presentation of multimedia and hypermedia, and 011 corresponds to JAVA protocol. If it is desired to communicate information about both the IP version and application protocols, this can be accomplished e.g. such that in every other frame, in which the protocol identifier is placed, the IP identifier value is 1 and AP identifier value 0 (so the protocol content identity group indicates the IP version) and in every other frame the IP identifier value is 0 and the AP value is 1 (the protocol content identity group indicates the application protocol). Other ways of communicating information about the both items include e.g. specifying the protocol identifier such that it has longer fields or that there are more of them. Then it is possible to communicate more information in one protocol identifier.

The second byte 504 in the data structure 500 is a content descriptor in which each bit serves as a flag. Thus, eight protocols may be identified, and the least significant bit in the byte, for example, corresponds to the highest-layer protocol. A content descriptor is specified for the protocol groups that can be identified in the protocol content identity group. For example, the following flags have been specified for the WAP group, starting from the least significant bit: Wireless Application Environment (WAE), Wireless Session Protocol (WSP), Wireless Transaction Protocol (WTP), Wireless Transport Layer Security (WTLS), and Wireless Datagram Protocol (WDP). Similarly, specified for the MHEG group are the MHEG control, MHEG startup container, MHEG object, and MHEG link. Packets marked with these descriptors contain certain type of information associated with the MHEG application, e.g. MHEG control packets contain control and synchronization information for the application presenting the multimedia objects.

A preferred embodiment of the invention is to use a protocol identifier in a situation in which application software, say a multimedia application, uses several separate data connections. If the multimedia objects are presented using the MHEG format, for example, the above-described or a corresponding protocol identifier may be used to identify said connections as belonging to one and the same application. These data connections may thus be controlled in a consistent manner at the radio access network interface, for example. Thus e.g. a situation is avoided in which the multimedia objects are successfully delivered to the other end of the connection but the control commands necessary for their presentation are not delivered because of lacking resources.

Figure 6:
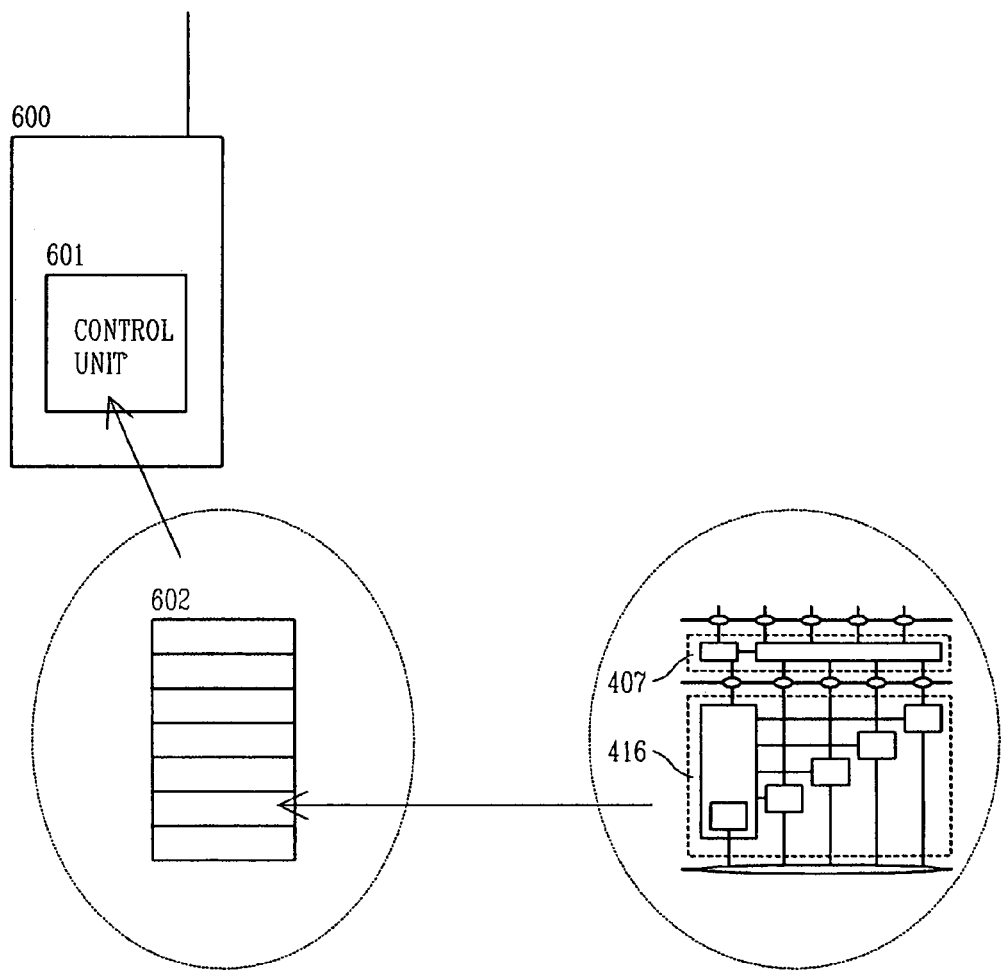
FIG. 6 shows a schematic of an apparatus that employs the method according to a preferred embodiment of the invention.

FIG. 6 shows an apparatus which applies the method according to a preferred embodiment of the invention. The apparatus 600 is a communications device, shown here as a wireless terminal. Operation of the apparatus is controlled by a control unit 601 which is responsible, among other things, for the protocol stack 602 associated with data communications. The method according to a preferred embodiment of the invention is applied to the second protocol layer in FIG. 6. By way of example, its structure is the same as in FIG. 4, and also shown in FIG. 6 are the compatibility layer 407 adjacent to the third layer and the logical link control layer 416. Elements and interfaces of these layers are not named in FIG. 6 but they are the same as in FIG. 4. The apparatus shown in FIG. 6 may include in LLC protocol frames information about the protocols of other layers e.g. so as to be used by a lower-layer protocol, and it can read information placed in these frames by another apparatus.

The protocol identifier structure and field contents described above by way of example do not limit the invention to the two-byte identifier described above which comprises the abovementioned fields. The hierarchical protocol identifier according to the invention may also have a different structure, and the protocols that can be identified by means of the identifier may be others than those named above.

The protocol identifier according to the invention need not be hierarchical. The protocol identifier may comprise one or more fields each of which identifies a protocol or protocol element, but the protocol identifier does not contain a structure that could be used to deduce the relationship between the objects identified by the fields. Consecutive fields in the protocol identifier may e.g. identify the codec used for the coding of a video image and a packet radio network along the data connection. Such a protocol identifier is also in accordance with the invention.

A protocol may also denote the contents of information transferred. The protocol identifier may indicate e.g. whether the information transferred is speech, video image or data in general. In the cases of speech and video it is also possible to identify e.g. the codec used for speech or video image coding, the version number of the codec or the standard with which the bit stream produced by the codec complies.

Although it was above described the use of the method according to the invention mainly at the interface between a fixed network and radio access network, the application of the invention is not limited to that particular interface.

Above it was described how the method according to the invention may be used primarily in the management of a data connection, selection of an information presentation format, and in the prioritization of information to be transferred. These examples however do not limit the use of the invention solely to these purposes.

What is claimed is:

1. A method for transferring information over a data connection according to a protocol stack where certain first protocol layers and certain second protocol layers exist, comprising:
    creating a protocol identifier;
    determining a value for said protocol identifier in accordance with the first protocol layers in said protocol stack;
    signaling said protocol identifier to the second protocol layers in said protocol stack;
    adapting said protocol identifier so as to comprise elements including a first element and a second element;
    determining each element of said protocol identifier on the basis of a certain part of the first protocol layers; and
    determining said second element so that it defines in more detail a certain part of the first protocol layers generally defined by said first element.

* * * * *